No. 758,819. PATENTED MAY 3, 1904.
R. G. CALLUM.
ELECTRIC SYSTEM FOR INDICATING THE TEMPERATURE
OF A DISTANT POINT.
APPLICATION FILED OCT. 28, 1902.
NO MODEL. 2 SHEETS—SHEET 1.
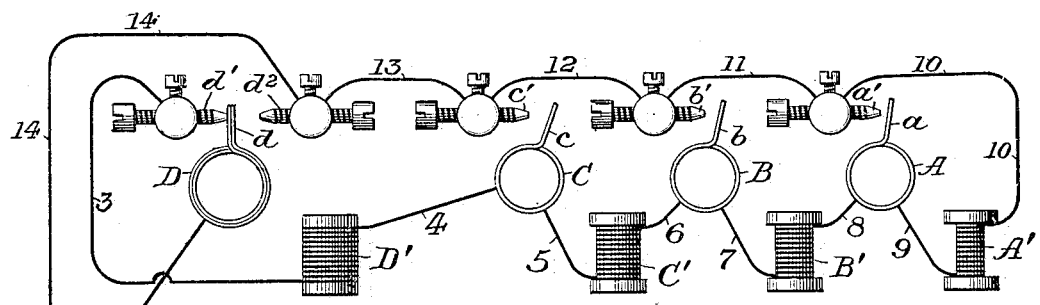
*Fig. 1.*
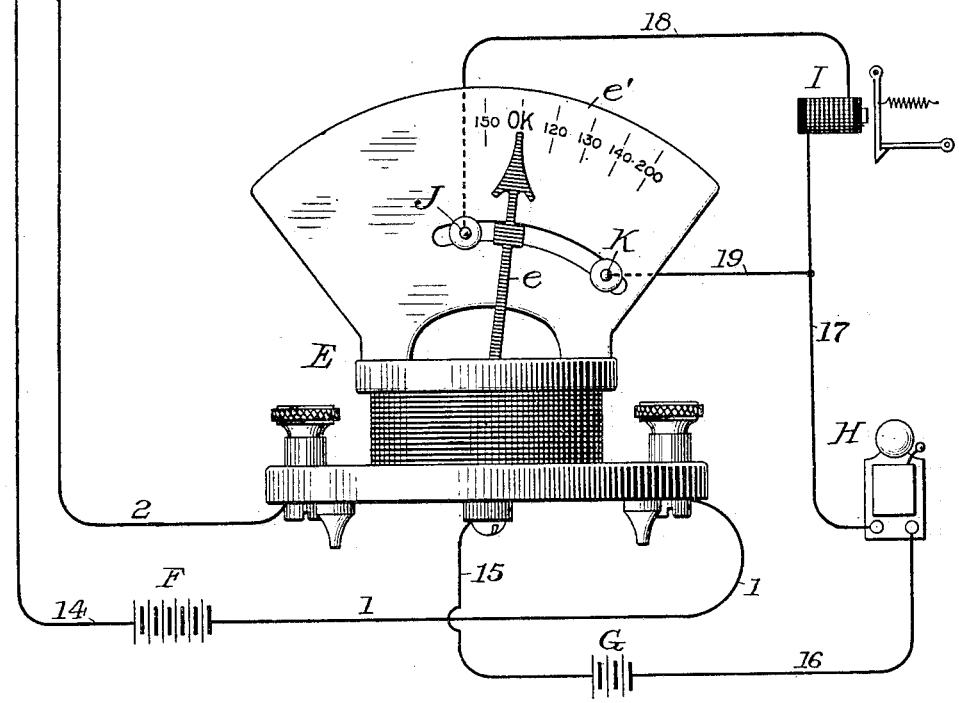
Attest:
[signatures]
Inventor:
Robert G. Callum
By [signature]
Attorney No. 758,819. PATENTED MAY 3, 1904.
R. G. CALLUM.
ELECTRIC SYSTEM FOR INDICATING THE TEMPERATURE
OF A DISTANT POINT.
APPLICATION FILED OCT. 28, 1902.
NO MODEL. 2 SHEETS—SHEET 2.
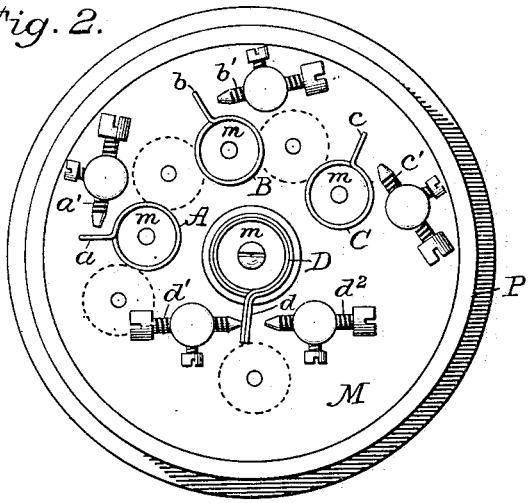
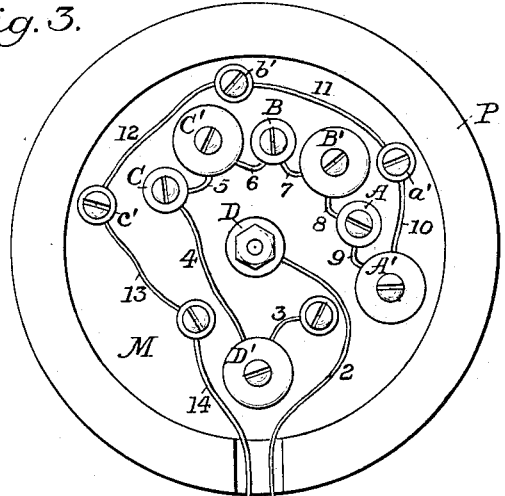
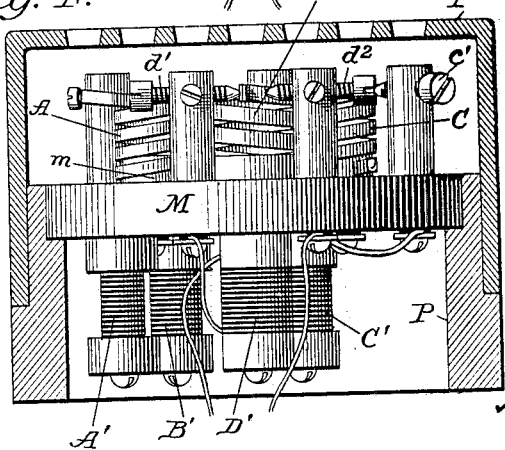

No. 758,819. Patented May 3, 1904.

UNITED STATES PATENT OFFICE.

ROBERT G. CALLUM, OF WASHINGTON, DISTRICT OF COLUMBIA.

ELECTRIC SYSTEM FOR INDICATING THE TEMPERATURE OF A DISTANT POINT.

SPECIFICATION forming part of Letters Patent No. 758,819, dated May 3, 1904.

Application filed October 28, 1902. Serial No. 129,067. (No model.)

*To all whom it may concern:*

Be it known that I, ROBERT G. CALLUM, a citizen of the United States, residing at Washington, in the District of Columbia, have invented new and useful Improvements in Electric Systems for Indicating the Temperature of a Distant Point, of which the following is a specification.

My invention relates to an electric system for automatically indicating the temperature of a distant point, and has been devised more especially for indicating the temperature of distant compartments or rooms provided for the storage of coal or other material and for giving an alarm should the temperature of such compartments or rooms reach a point dangerous to the material or goods stored therein. It is to be understood, however, that a system embodying invention is adaptable for use wherever it may be desirable to indicate the temperature of a distant point.

The main objects sought by me are, first, the production of a simple and reliable system that may be readily adjusted to suit particular requirements, and, second, a system which will itself show whether variations in the indicating device have, in fact, been caused by variations in temperature at the distant point or by an accidental derangement of the system or apparatus employed therein. To accomplish the ends sought, I provide two or more separately-adjustable thermostats which are connected in series in a normally closed electric circuit, said thermostats being located at the distant or guarded point and each being adjusted and arranged to establish shunt-circuits at predetermined different degrees of temperature for decreasing or increasing resistance in the main circuit. Connected in said circuit at the point where the temperature is to be read is a galvanometer or other current-measuring device which will indicate variations in the normal current or circuit. The adjustment and the resistance controlled by each thermostat being known, the position of the indicator of the current-measuring device will indicate the temperature at the distant point. By the employment of two or more separately-adjustable thermostats the particular degrees of temperature to be indicated may be changed to suit particular requirements, and the failure of one thermostat to operate cannot interfere with a proper operation of the others.

In all prior systems wherein resistance in an electric circuit is varied by thermostatic devices for indicating by means of a current-measuring device variations in temperature at a distant point no provision has been made for distinguishing between variations in resistance caused by the operation of the thermostatic devices and variations that may be caused by accidental derangement of the system or apparatus—as, for instance, an accidental crossing of wires—which might cause the current-measuring device to indicate a dangerous degree of heat when in point of fact the temperature at the distant point is normal. In order that it may be positively known whether variations in the indicating device have been caused by variations in temperature or by accident, I provide for automatically opening the circuit at a predetermined temperature and again closing it at a different degree of temperature, so that it may be known that the system is in proper working order. I also provide a device for registering the opening of the circuit, the operation of said device serving as record proof of the character of subsequent variations in the indicating device.

After a detailed description of a system embodying my invention the features deemed novel will be specified in the claims hereunto annexed.

Referring to the drawings furnished and forming a part of this specification, Figure 1 is a diagrammatic illustration of a system embodying all the features of my invention. Fig. 2 is a plan view of a thermostatic instrument with its outer cover removed, said instrument being designed for use in the system illustrated in Fig. 1. Fig. 3 is a rear view of said instrument; and Fig. 4 is a section through the case thereof, disclosing the interior parts in side elevation.

The thermostats A, B, C, and D which I have employed for carrying out my invention each consists of a spirally-wound strip of metal, having one end attached to a fixed support and the free end bent to form a radially-projecting arm, which will be moved in a circular path toward and from an adjustable contact by variations in temperature, these thermostats, with their coöperating contact, being of well-known construction and requiring no detailed description. Each of these devices is adjusted by means of the adjustable contacts, so that each thermostat will be moved into or out of contact with its appropriate contact at a predetermined different degree of temperature. The system illustrated being designed for a particular use hereinbefore referred to, the contact $a'$ is adjusted so that arm $a$ of the thermostat A will contact therewith at a temperature of 120°, the contact $b'$ is adjusted so that arm $b$ of the thermostat B will contact therewith at a temperature of 130°, and contact $c'$ is adjusted so that arm $c$ of the thermostat C will contact therewith at a temperature of 140°. The arm $d$ of the thermostat D moves between two adjustable contacts $d'$ and $d^2$, the former being normally in contact with said arm and so adjusted that said arm will move therefrom at a temperature of 150°. Contact $d^2$ is adjusted so that said arm $d$ will contact therewith at a temperature of 200°. It is to be understood that these adjustments may be changed to suit the requirements of the particular use for which the system is intended. These thermostats are located at the distant or guarded point and are connected in series in a normally closed electric circuit, and each operates to establish a shunt-circuit for excluding or including resistances A', B', C', and D', which may be normally in or out of the circuit. At the point where the indications are to be read there is a galvanometer or other current-measuring device E, which is connected in circuit with the several thermostats and resistance-coils as follows: From a suitable battery F current passes over a wire 1 to and through the galvanometer-coil, thence over a line-wire 2 to the thermostat D, thence by way of contact $d'$ and a wire 3 to the resistance-coil D', thence over a wire 4 to the thermostat C, over a wire 5, through the resistance-coil C', over a wire 6 to and through the thermostat B, thence by way of a wire 7 to and through the resistance-coil B', over wire 8 to the thermostat A, thence through wire 9, resistance-coil A', and wire 10 to the contact $a'$, thence through wire 11, contact $b'$, wire 12, contact $c'$, and wire 13 to contact $d^2$, and thence back to battery by way of line-wire 14. The course of the current above described is the normal circuit, and the needle $e$ of the galvanometer E is maintained thereby at the point marked "O K" on the dial $e'$. When the temperature at the distant point reaches 120° or the temperature to which the thermostat A is adjusted, the latter will establish a shunt-circuit from the thermostat to the contact $a'$, and thus exclude the resistance A' from the main-line circuit. This will cause the galvanometer-needle to move to the position marked "120" on the dial, and thus indicate the temperature at that moment at the distant point. When the temperature reaches 130°, the thermostat B establishes a shunt-circuit from said thermostat through the contact $b'$ to exclude the resistance-coil B' from the circuit, and at the same time it also cuts out resistance-coil A' and thermostat A from the circuit should the latter for any reason have failed to operate, so that the galvanometer-needle $e$ will in any event be moved to its proper position for indicating 130° of temperature at the distant point. At a temperature of 140° the thermostat C establishes a shunt-circuit from said thermostat to the contact $c'$ which cuts out the resistances C', B', and A' and the thermostats B and A, thereby causing the galvanometer-needle to move for indicating a temperature of 140°. Now when the temperature reaches 150° the circuit will be opened by the arm $d$ of the thermostat D leaving the contact $d'$. The galvanometer-needle will then assume an upright position, (marked "150" on the dial,) and when the temperature reaches 200° a circuit is again established through the thermostat D and contact $d^2$. All of the resistance being thus excluded from the circuit, the galvanometer-needle moves to the "200" mark on the dial for indicating that degree of temperature at the distant or guarded point. The opening and subsequent closing of the circuit at different degrees of temperature is for the purpose of proving the working condition of the system, it being readily apparent that the galvanometer-needle cannot be moved to the "200" mark solely by a change in temperature without first assuming the open-circuit position marked "150" on the dial, but that it will be moved to the "200" mark without first assuming the open-circuit position if the line-wires be accidentally crossed or grounded in such a manner as to short-circuit the resistance-coils controlled by the thermostats.

At the galvanometer end of the line I provide a normally open local circuit including two signaling devices, preferably a bell H and an annunciator I and a battery G. The needle $e$ of the galvanometer is connected by a wire 15 with the battery G, and from the opposite side of the battery a wire 16 connects with the bell H, the latter being in turn connected to the annunciator I by a wire 17, and from said annunciator a wire 18 connects with a contact J, arranged at the left of the galvanometer-needle, so that the latter will close the local circuit when it assumes an upright or open-circuit position. At the right of said needle is a contact K, which is connected by a wire 19 to the wire 17 between the annunciator I and bell H, said contact K being arranged in proper position for closing the circuit through the needle $e$ when the latter is moved to the "200" mark indicated on the dial. Now when the galvanometer-needle is moved for indicating an open circuit the annunciator I will be operated and the bell H will give a warning-signal. When the needle moves to the "200" mark, the bell H will be operated; but this signal must be read in connection with the annunciator. If the latter has been previously operated by an open circuit in the main line, it will be known that there is a temperature of 200° at the distant or guarded point; but if the annunciator has not been previously operated the signal will simply mean that there is an accidental ground or short circuit in the main circuit.

The thermostats A, B, C, and D, with their coöperating contacts $a'$, $b'$, $c'$, $d'$, and $d^2$ and the resistances A', B', C', and D', have been arranged by me into a single compact structure, which I have illustrated in Figs. 2, 3, and 4 of the accompanying drawings. The thermostats are each secured to suitable posts or blocks $m$, mounted on a supporting block or disk M of insulating material. The contacts $a'$, $b'$, $c'$, $d'$, and $d^2$ are each supported on said disk M in appropriate relations to the thermostats, and the resistance-coils A', B', C', and D' are secured to the rear of said disk, as clearly shown in Fig. 4. The electric connections, as heretofore described, are made as clearly illustrated in Fig. 3, the connecting-wires being marked in said figure to correspond with the numbering of the wires connecting corresponding parts in Fig. 1. The disk or block M is mounted on or in a circular support P, which forms a housing for the resistance-coils at the rear of the disk, and an outside perforated cover P' is provided for protecting the devices mounted on the face or front of the disk, as clearly illustrated in Fig. 4.

The operation of the system is as follows: The thermostats A, B, and C being arranged to cut the resistances A', B', and C' out of the main circuit at 120°, 130°, and 140°, respectively, and the thermostat D being arranged to open the circuit at 150° and again close it at 200° through a shunt-circuit which excludes the resistance D', the galvanometer-needle will be deflected for indicating the successive removal of the resistances A', B', and C' and will assume an open-circuit position when the circuit is opened by the thermostat D and will be again deflected when the circuit is again closed, as will be readily understood. As heretofore explained, the thermostats B', C', and D' each operate to cut out the resistances which are directly controlled thereby, as well as the resistance or resistances controlled by the thermostats which operate previously thereto should the latter fail in their duty. When the temperature at the distant point reaches 120°, the thermostat will operate to exclude the resistance A' from the circuit, which will cause the galvanometer-needle to be deflected from the position marked "O K" on the galvanometer-dial to the position marked "120" for indicating the temperature existing at that moment at the distant point, and said needle will in like manner be deflected to the positions marked "130" and "140" by the operation of the thermostats B and C, which respectively operate to exclude the resistances B' and C'. When the temperature reaches 150°, the thermostat D will operate to open the circuit for causing the galvanometer-needle to assume an upright or open-circuit position, (marked "150" on the dial.) This position of the needle, as heretofore explained, closes the local alarm-circuit and causes the annunciator I and bell H to operate, the former indicating the fact that the circuit has been opened and the latter giving a warning-signal. When the temperature reaches 200°, the thermostat D operates to close the circuit through the contact $d^2$, which excludes all of the resistances from the circuit and causes the galvanometer-needle to be deflected to the position marked "200" on the dial. The local circuit is then closed through said needle and the contact K for causing the bell H to sound the alarm, said local circuit when thus closed excluding the annunciator I, as heretofore explained. It will thus be seen that the galvanometer-needle cannot be deflected to the "200" position by changes in temperature without first assuming an open-circuit position, but that said needle will be deflected to the "200" position without first assuming an open-circuit position should the line-wires be accidentally crossed or grounded in such a manner as to short-circuit the resistances controlled by the thermostats. It will therefore be apparent that should the galvanometer-needle be deflected to the "200" position the condition of the annunciator I will positively determine whether the deflection has, in fact, been caused by excessive heat at the distant point or by an accidental derangement of the system.

Having thus described my invention, what I claim as new, and desire to secure by Letters Patent, is—

1. In a system for automatically indicating the temperature of a distant point, a normally closed electric circuit, a current-measuring device included therein, and two or more thermostats connected in series in said circuit and adapted to establish shunt-circuits at different temperatures for decreasing or increasing resistance in the main circuit, substantially as described.

2. In a system for automatically indicating the temperature of a distant point, a normally closed electric circuit, a current-measuring device included therein, two or more thermostats connected in series in said circuit and adapted to establish shunt-circuits at different temperatures for decreasing or increasing the resistance of the main circuit, said thermostats also operating to include in or exclude from the established circuit that portion of the normal circuit which may have been previously included or excluded by the operation of one or more of said thermostats, substantially as described.

3. In a system for automatically indicating the temperature of a distant point, a normally closed electric circuit, a current-measuring device included therein, a series of thermostats and an adjustable contact for each of said thermostats, said thermostats and contacts being connected in series in said circuit, substantially as and for the purposes described.

4. In a system for automatically indicating the temperature of a distant point, a normally closed electric circuit, a current-measuring device included therein, and a thermostatic device adapted to open said circuit at a predetermined temperature and close it through a shunt-circuit at a different degree of temperature, substantially as and for the purposes specified.

5. In a system for automatically indicating the temperature of a distant point, a normally closed electric circuit, a current-measuring device therein, a shunt-circuit for decreasing or increasing resistance, and a thermostatic device adapted to open the main circuit at a predetermined temperature and close it through said shunt-circuit at a different temperature, substantially as and for the purposes described.

6. In a system for automatically indicating the temperature of a distant point, a normally closed electric circuit, a current-measuring device included therein, two or more thermostats adapted to shunt said circuit at different temperatures for decreasing or increasing resistance, and means whereby the circuit will be opened at a predetermined temperature and closed at a different temperature through the operation of one of said thermostats, substantially as described.

7. In a system for automatically indicating the temperature of a distant point, a normally closed main circuit, a current-measuring device included therein, a shunt-circuit for decreasing or increasing resistance, a thermostatic device adapted to open said main circuit at a predetermined temperature and close it through said shunt-circuit at a different temperature, and a normally open local circuit including separate signaling devices, said local circuit being adapted to be closed through both of said signaling devices by said current-measuring device when the main circuit is opened and to be closed through one of said signaling devices by said current-measuring device when said shunt-circuit is included in the main circuit, substantially as described.

In testimony whereof I have hereunto set my hand in presence of two subscribing witnesses.

ROBERT G. CALLUM.

Witnesses:
W. G. ANDERSON,
J. W. TAYLOR.